Dec. 15, 1953 J. H. BIERLICH 2,662,592
VENETIAN BLIND
Filed Feb. 27, 1951 3 Sheets-Sheet 1

INVENTOR:
Johannes Harald Bierlich,
BY
[signature]
His Agent.

Dec. 15, 1953 J. H. BIERLICH 2,662,592

VENETIAN BLIND

Filed Feb. 27, 1951 3 Sheets-Sheet 2

INVENTOR:
Johannes Harald Bierlich,
BY
[signature]
His Agent.

INVENTOR:
Johannes Harald Bierlich,
BY
[signature]
His Agent.

Patented Dec. 15, 1953

2,662,592

UNITED STATES PATENT OFFICE 2,662,592

VENETIAN BLIND

Johannes Harald Bierlich, Copenhagen, Denmark

Application February 27, 1951, Serial No. 212,849

7 Claims. (Cl. 160—173)

Figure 1:
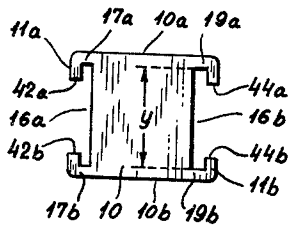

This invention relates to Venetian blinds.

Various attempts have been made to provide a Venetian blind structure in which the traditional type of fabric ladder is substituted by hinged links.

It is one purpose of my invention to provide a link type blind ladder, which is not thick or bulky, and which will allow the blind to be raised to a position in which it occupies the least possible space.

A further object of my invention is to provide a hinged link type collapsible ladder for Venetian blinds, which will allow a Venetian blind having even thin metal slats to be raised to a position, in which the slats are brought so closely together as possible without any interference from the ladder link joints.

Still a further object of my invention is to provide a collapsible Venetian blind ladder of the type here referred to, which may be easily assembled and disassembled and which will require no pivotal hinge connections of the traditional type comprising hinge pins even at the connection joints to an adjacent slat.

Still a further object of my invention is to provide a Venetian blind structure, in which the hinge links will at all times break uniformly in the desired direction and which will break inwardly between the slats upon each other, when the slats are brought together so as to occupy minimum space in broken position and thereby enable a construction in which the Venetian blind can be mounted between spaced glass surfaces in double glass windows.

Another object of my invention is to provide a Venetian blind structure, in which the blind slats are supported by link type blind tapes, without the necessity of providing cross bars between the tapes, and in which no pivotal hinge connections of the traditional type are used.

A further object of my invention is to provide a Venetian blind collapsible tape comprising a plurality of folding pairs of pivotal links, which can be folded in surface-to-surface relationship to occupy the least possible space in folded position.

Another object of my invention is to provide a chain link element, which is adapted to be joined in edge-to-edge relationship with other chain elements to form therewith a Venetian blind tape, in which the elements are able to fold in surface-to-surface relationship to occupy the least possible space in folded position.

Another object of my invention is to provide a slat supporting member, which is adapted to be joined between Venetian blind tapes of the link type to form a collapsible ladder, in which the tape links can be folded in close surface-to-surface relationship with the slat supporting members, so as to occupy the least possible space in folded position.

My invention further has as an object to provide a method for assembling chain link elements to provide Venetian blind tapes by means of which the elements can be joined in edge-to-edge relationship continuously.

Figure 3:
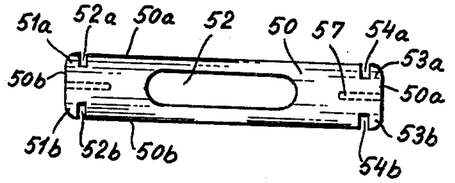
Figure 2:
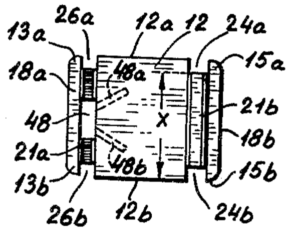
Figure 4:
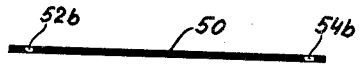
Figure 5:
Figures 6, 7, 8:
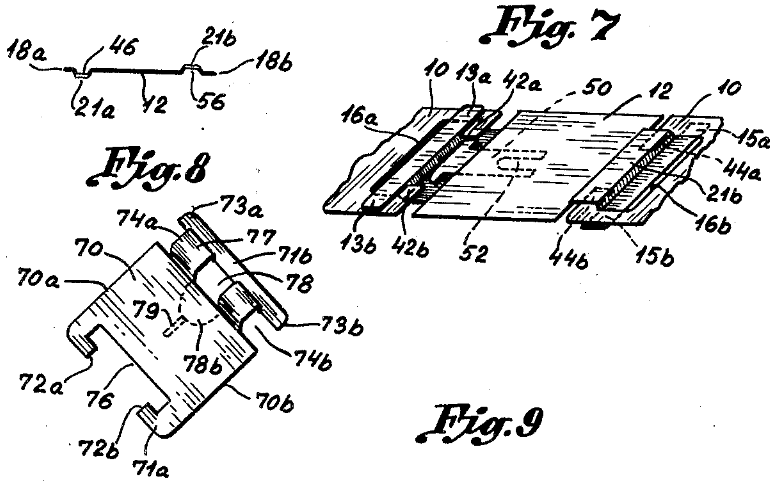
Figure 9:
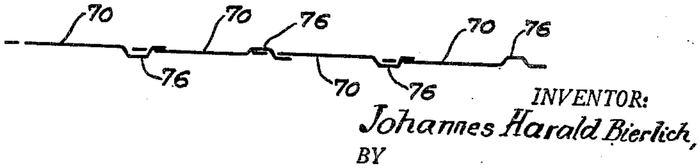
Figure 11:
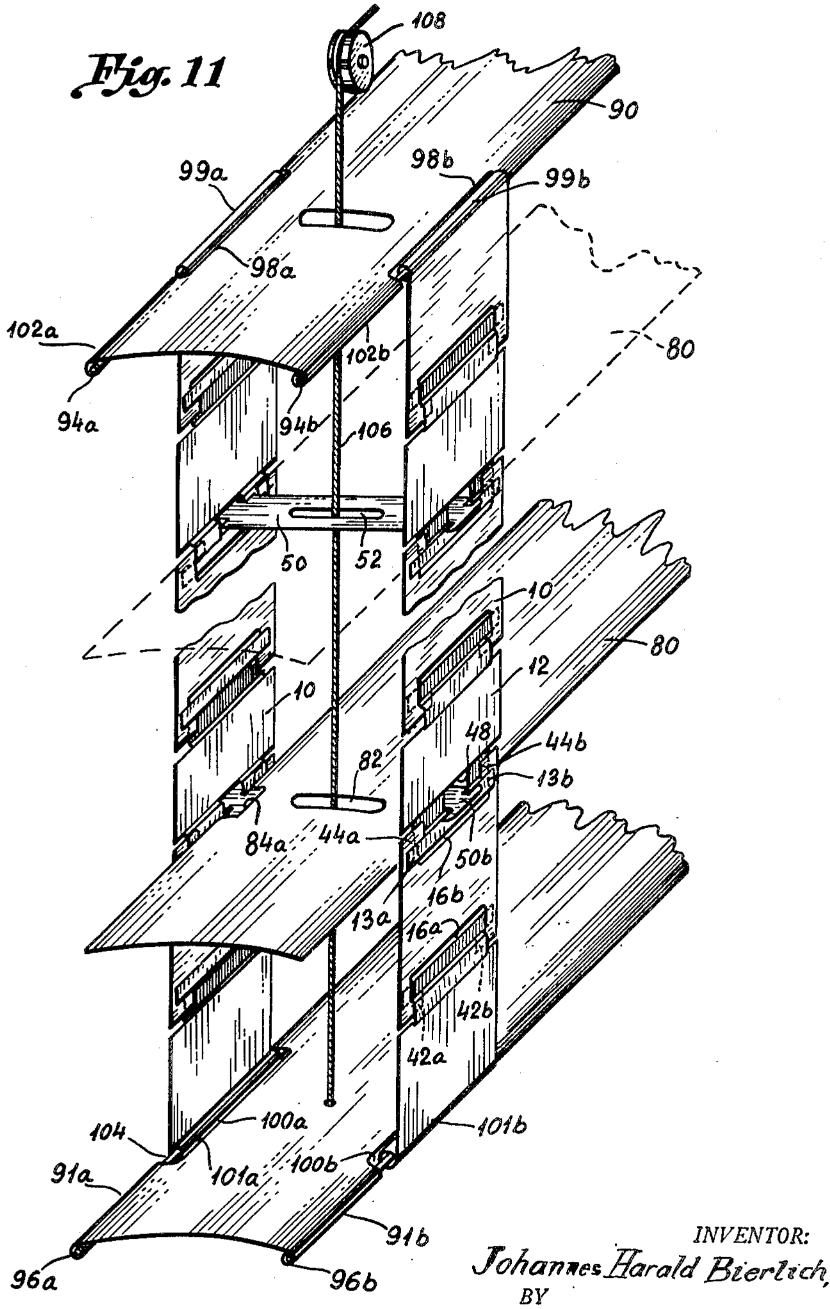
Figures 10, 12:
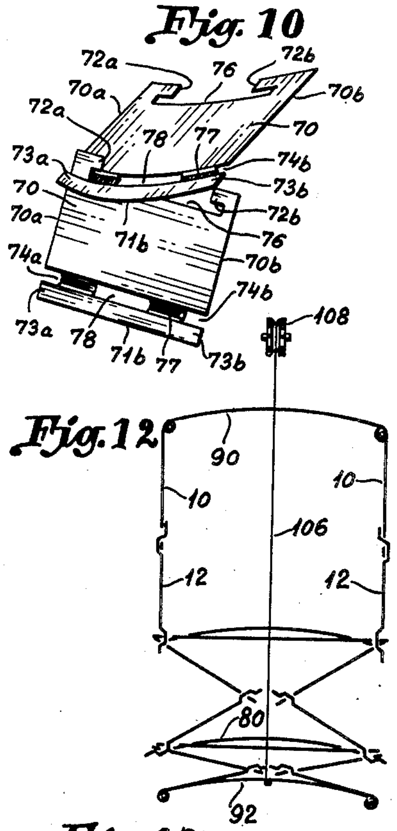
Figure 13:
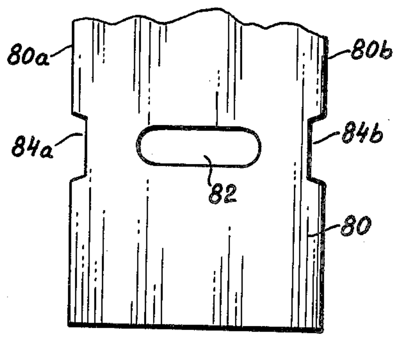
Figure 14:
Figure 15:
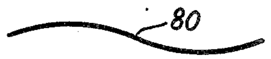
Figures 16, 17:
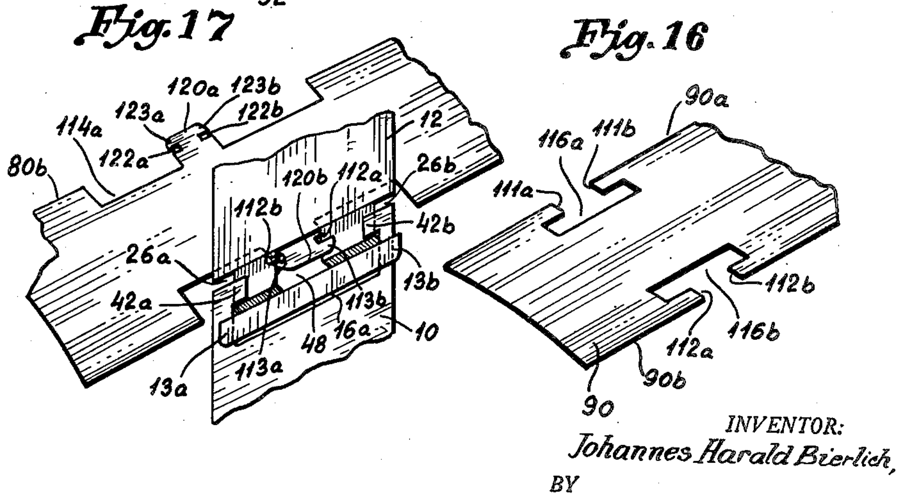

With these and other objects in mind, which will appear from the following description, the invention will now be further described in more detail with reference to the accompanying drawing, in which:

Figure 1 is a plan view of one embodiment of a link for a collapsible link type Venetian blind ladder according to the invention, Figure 2 is another embodiment of the link for such a chain adapted to be assembled alternately with links as those shown in Figure 1, Figure 3 is a plan view of a transverse ladder bar adapted to be assembled with links of the link chain to form a complete ladder, Figure 4 is a side view of the transverse bar shown in Figure 3 in one embodiment thereof, Figure 5 is a side view of the transverse ladder bar shown in Figure 3, in another embodiment thereof, Figure 6 is a side view of the link shown in Figure 2 in a preferred embodiment, Figure 7 is a perspective view showing the assembly of links as shown in Figures 1 and 2 with a transverse ladder bar as that shown in Figure 3, Figure 8 is a perspective view of another embodiment of a link for a collapsible Venetian blind ladder according to the invention, Figure 9 is a side view illustrating assembly of links as that shown in Figure 8, Figure 10 is a perspective view of two links as shown in Figure 8 illustrating the way of assembling these links, Figure 11 is a perspective view of one end of an assembled Venetian blind comprising a ladder assembled by means of links as shown in Figures 1 and 2 and transverse bars as shown in Figure 3, Figure 12 is an end view of the blind shown in Figure 11 partly in raised position, Figure 13 is a plan view of a blind slat as used in the blind shown in Figure 11, Figure 14 is an end view of the blind slat shown in Figure 13 in one embodiment thereof, Figure 15 is an end view of the blind slat shown in Figure 13 in another embodiment thereof, Figure 16 is a perspective view of one end of a top or bottom bar for a Venetian blind as that shown in Figure 11 in another embodiment thereof, and Figure 17 is a perspective view of a part of a Venetian blind corresponding to that shown in Figure 11, in which the slat supporting members instead of being in form of transverse ladder bars are provided as an integral part of the slats themselves.

While in the following description there will be shown and described different embodiments of links for the link chain adapted to support the blind slats it will be understood that these embodiments are only meant as examples, so that for instance links as shown in Figure 8 may be substituted for those shown in the complete assembled blind of Figure 11. Correspondingly it will be understood that for instance the top and bottom bar construction illustrated in Figure 16 may be used in combination with any of the embodiments of links illustrated just as any of these embodiments may be utilized in connection with self supporting slats having integral projecting supporting members as well as in connection with a collapsible link ladder having transverse bars.

Referring now to Figure 1, 10 designates a link for a supporting link chain for the slats of a Venetian blind. This link is a plane element of sheet or plate material of any convenient kind. As material thin metal plate may be used or there may be used thin plate of any other convenient material such as Celluloid, polyvinyl or other thermoplastic materials. The element 10 has side edges 10_a_ and 10_b_ and end edges 11_a_ and 11_b_. The element 11 is adapted to be joined in edge-to-edge relation to neighbour elements at the edges 11_a_ and 11_b_ and to this purpose there is provided adjacent the edge 11_a_ a transverse slot 16_a_ substantially parallel with the edge but spaced therefrom. In a corresponding manner there is provided adjacent the edge 11_b_ a similar transverse slot 16_b_. In order to allow an easy assembly of the link elements in the manner, which will be described in more detail in the following, the edge material between the edges 11_a_ and 11_b_ and the slots 16_a_ and 16_b_ is cut away at the middle portions along the transverse slots so as to only leave at the end of each slot opposite projecting ears 42_a_, 42_b_ and 44_a_, 44_b_ respectively.

The element shown in Figure 2 is generally referred to as 12. This has side edges 12_a_ and 12_b_ and edges 18_a_ and 18_b_, the latter being adapted to be joined in edge-to-edge relation with the element shown in Figure 1. To this purpose the element 12 has adjacent the edge 18_a_ side notches 26_a_, 26_b_ extending from the opposite side portions 12_a_ and 12_b_ respectively in spaced relationship from the edge so as to leave adjacent the edge projecting ears 13_a_ and 13_b_. In a similar manner there is provided near the edge 18_b_ side notches 24_a_, 24_b_ providing adjacent the edge projecting ears 15_a_, 15_b_.

While the transverse slots 16_a_, 16_b_ in Figure 1 terminate in some distance from the side edges 10_a_, 10_b_ so as to leave at their ends material portions 17_a_, 17_b_ and 19_a_, 19_b_ the side notches 24_a_, 26_a_ and 24_b_, 26_b_ extend in the element 12 slightly deeper than these material portions. The side notches should, however, only extend so deep that they leave between their bottoms material portions 21_a_ and 21_b_ having a lateral extension $x$ which is larger than the lateral distance $y$ between the end of one of the opposite directed ears for instance 42_a_ and the opposite end of the slot 16_a_ in the element shown in Figure 1.

It will be understood from the foregoing description that the elements shown in Figures 1 and 2 can be joined together in edge-to-edge relation by arranging for instance the edge portion of the element 12 beyond the side notches 24_a_, 24_b_ to extend through the transverse slot 16_a_ whereby the ears 15_a_ and 15_b_ of the element 12 will grip behind the ears 42_a_, 42_b_ of the element 10, and simultaneously extend beyond the ends of the slot so as to secure the edge portion in extending position. It will be understood that once hinged together to form a hinge joint in the manner here described, the elements are prevented from being disconnected without force applied of a magnitude to distort the ears.

The assembly may in a convenient manner be effected by bending the element 12 at least at that edge which is to be connected with the edge of the element 10 so as to thereby shorten the distance X between the bottoms of the side notches so much that the distance becomes less than the distance Y, thereby allowing the edge of the element 12 to be introduced in the element 10 through the cut-away edge portion between the opposite ears of the element 10. By hereafter again flattening the element 12 the joint will be effected. By using as material for the hinge elements some convenient metal or other elastic material, the bent element will after being introduced in the right position and upon release of the bending force automatically flatten itself and resume its plane position thereby simultaneously joining the two elements together.

When assembling the elements in the manner here described in order to form a link chain for a collapsible Venetian blind ladder it will be understood that the one way break hinge joints formed by joining the elements in edge-to-edge relation has to be arranged so that the joints are breaking alternately in opposite directions.

In order to support the blind slats, slat supporting members an embodiment of which is shown in Figure 3 are provided adapted to be connected with a pair of link chains so as to form a collapsible ladder.

The slat supporting member as shown in Figure 3 is in form of a transverse ladder link generally referred to as 50. The transverse ladder bar is in form of an elongated plate-formed member having side edges 50_a_ and 50_b_. The element may be of a convenient material of the same or other kind as the link elements shown in Figures 1 and 2. Near the one end 50_a_ there is provided side notches 54_a_ and 54_b_ so as to provide adjacent the end projecting ears 53_a_ and 53_b_. In a corresponding manner there is provided adjacent the end 50_b_ side notches 52_a_ and 52_b_ so as to provide projecting ears 51_a_ and 51_b_ adjacent the end 50_b_.

The transverse bar 50 may either as shown in Figure 4 be of plane shape or it may as shown in Figure 5 be slightly arcuate or S-formed along its length so as to comply with a corresponding curve form of the slat, which it is adapted to support.

The transverse bars are in the final collapsible ladder chain adapted to extend at each end beyond and through the link chain and be secured in said extending position. To this purpose there is provided in the link 12 at least adjacent one edge thereof—in the embodiment shown adjacent the edge 18_a_—an aperture 48, which extends between the inner edges of the side notches 26a and 26b. The length of this aperture is slightly shorter than the width of the element 50, but slightly longer than the distance between the bottoms of the side notches 52a and 52b or 54a, 54b. On the other hand the length of the aperture 48 should also be slightly longer than the distance Z between the bottom of one of the side notches, for instance 52a and the end of the opposite ear 51b, so as to prevent that end of the bar 50, which extends through the link 12 to escape from the extending position, once it is brought therein.

In order to arrange the transverse bars in their position extending beyond and through the links 12 the bars may be subjected to a slight curving action in a similar manner as in the case of joining the elements 12 and 10.

As another embodiment there may be provided in the element 12 extending from the aperture 48 in inclined relation thereto slots 48a and/or 48b. Each of these slots extends from points near corners of the aperture 48 and is preferably directed against the opposite corner so as to allow an end of the bar element 50 to be introduced in the aperture 48 in an inclined position with respect to its edge and then being locked in the aperture 48, when it is brought in such extending position through the element 12 that the side notches align with the plane of the element.

As a further embodiment there may be provided in the slat supporting member 50 as indicated in dotted lines, longitudinal notches 57 extending in opposite directions from the opposite ends and extending beyond the side notches so as to allow the sidewardly projecting ears to yield elastically inwardly when introduced in the rectangular aperture 48 of the element 12. In that case the inclined slots 48a and 48b can be omitted.

From the foregoing description it will readily be understood how a collapsible Ventian blind ladder chain can be assembled and will be able to support the blind slats in the manner as shown in Figure 11 and to be described in more detail in the following.

It will be understood that by joining absolute plane elements together in edge-to-edge relationship in the manner here described it will not be possible to extend the joined links so as to be in absolute alignment and neither will it be possible to allow the links to fold absolutely surface-to-surface without slightly deforming the links, because the thickness of the material will neither allow the joints to break down to zero angle nor allow the joints to open to 180°.

The purpose of providing a link chain which occupies the least possible space in collapsible position makes it desirous to allow the links to break down to zero angle. It will also be desirous to have an opening angle of 180°, because that will give the most attractive appearance of the ladder in lowered position. The links, therefore, are in a preferred embodiment not plane all over their entire length, but are provided with slightly offset portions.

The purpose might be achieved by slightly offsetting the edge portions of the element shown in Figure 1. This would mean, however, that it would be the ears remaining at the end of the edge, which were offset. Though such an embodiment may be used in practice it is more convenient to provide the offset portions in the element 12 as shown in the embodiment of the side view in Figure 6. Here the material portions 21a and 21b are slightly stamped out of the plane of the link element so as to provide pockets 46 and 56. Considering that the links are joined to break alternately in opposite directions the stamped out pockets are at the two ends of the element arranged extending in opposite directions.

As illustrated in Figure 7 the pocket 46 will in the assembled ladder with the links in aligned position receive the ears 44a and 44b of the neighbour element 10 as well as the ears 51a and 51b of the transverse bar element 50, while the pocket 56 will receive the ears 42a and 42b of the other neighbour element 10.

It will be understood that also in folded position the pockets will receive the ears of the neighbour elements so as it is more detailed shown in Figure 12.

Instead of as in the case of the embodiments according to Figures 1 and 2 to have two different types of links it is also possible to build up the link chain of one single standard type of link as that shown in Figure 8.

Here the link is generally referred to as 70. The link is as in the case of the links 10 and 12 in form of a substantially plane plate having side edges 70a and 70b and end edges 71a and 71b. Near the end edge 71a a transverse slot 76 is provided, the middle portion of which opens in communication with the edge, leaving between the slot and the edge oppositely directed ears 72a and 72b. Near the edge 71b there are provided side notches 74a and 74b in spaced relationship from the edge so as to leave adjacent the edge projecting ears 73a and 73b. The material portion between the bottoms of the side notches 74a and 74b is designated by 77 and in this there is provided an aperture 78 corresponding to the aperture 48 of the element 12. The form of this aperture differs from the elongated aperture shown in Figure 2 therein that it has one linear edge 78a adapted to support the slat supporting member, while the opposite edge 78b is curved and provided with a slot 79 extending substantially from the middle of the curved edge 78b. It will be understood that the vertical distance from the linear edge 78a to the opposite point of the curved edge should be equal to or slightly larger than the distance between the bottom of the two side notches, for instance 52a and 52b, in the transverse bar element 50. Furthermore the material portion 77 is stamped slightly out of the plane of the element itself so as to provide pockets to receive the ears 72a and 72b of the neighbour element when two elements are joined together.

By assembling a link chain from standard elements as shown in Figure 8 it will be understood that they are joined alternately with the pockets in opposite directions as shown in Figure 9 so as to allow the links to break alternately in opposite directions.

Figure 10 illustrates the way of assembling the links. One link is fed to a tool (not shown), in which the link is clamped so that at least its edge 71b is curved to such an extent that the linear distance between the bottom of the side notches 74a and 74b is reduced to an extent, which is less than the distance between the end of the ear 72b and the opposite end of the slot 76. Another element is then arranged in substantial vertical position to the curved element and the one end, for instance the left hand end of the material portion 77 is introduced in the left hand end of the slot 76, which will allow the ear 72b to pass up through the side notch 74b whereafter the curved element is brought back to its plane position. This operation is then repeated with the elements fed to the curving tool with the pockets alternately in opposite directions. By automizing the feeding and introducing a gripping device to remove that link which has last been subjected to curving action and moving it together with the remaining part of the chain to the position, in which it is vertical to the next link brought forward, this assembly can be made automatically.

When the link chains have been assembled in the desired length the transverse bars are inserted in the position extending through the apertures in the links so as to form a collapsible ladder chain for supporting the slats in order to provide a Venetian blind.

One end portion of a Venetian blind having collapsible ladder assembled from links as those shown in Figures 1 and 2 is shown in Figure 11. The way of joining the elements has been so fully described in the foregoing that it needs not to be repeated here. It will be understood, however, that similar collapsible ladders may also be assembled from links as that shown in Figure 8 in the manner more specifically shown in Figure 9.

In the embodiment shown in Figure 11 the slats are generally referred to as 80. The end portion of a slat is more detailed shown in Figure 13. From the lateral edges 80*a* and 80*b* of the slat there extends at the points where the link chains are to be arranged side notches 84*a* and 84*b* and between the bottom of these side notches there is arranged an elongated transverse slot 82 corresponding to the elongated slot 52 in the transverse bar 50, adapted to allow passage of an operating cord 106 passing over a roller 108 for raising and lowering the blind in the well known manner. The slats may be either slightly curved in cross section, as shown in Figure 14, or slightly S-formed as shown in Figure 15.

In the embodiment shown in Figures 11 and 12 the Venetian blind is provided with a top bar 90 and a bottom bar 92, each of which has their edges within the limits of the lateral edges of the slats and substantially as the slats themselves are in form of thin, slightly curved metal, only with the difference that the edges of the top and bottom bars are rolled to form beads 102*a* and 102*b*, and 91*a*, 91*b* respectively. In these beads there are provided reinforcement wires 94*a*, 94*b* and 96*a*, 96*b* respectively. Along the portions where the link chains are to be joined to the top and bottom bars, there are in the edges thereof provided notches 98*a*, 98*b* and 100*a*, 100*b*, respectively. The top edges of the top link and the bottom edges of the bottom links are rolled so as to form beads 99*a*, 99*b* and 101*a*, 101*b* respectively, in which the reinforcement wires are passing in form of hinge pins so as to join the top and bottom links to the top and the bottom bars by hinge connections. This embodiment requires as it will be understood special top and bottom links in the link chains and in order to avoid the necessity hereof the joints between the link chains and the top and bottom bars may be provided in a similar manner as between the links themselves. Such an embodiment is illustrated in Figure 16 with reference to the top bar 90, to provide adjacent the edges thereof 90*a* and 90*b* and spaced therefrom longitudinal slots 116*a* and 116*b* openings to the edges along the middle portions thereof so as to leave between the edges and the ends of the slots opposite ears 111*a*, 111*b* and 112*a*, 112*b* respectively. It will be understood that this construction of the top and bottom bars will enable joints with elements as shown in Figure 2 or with the end portion 71*b* of the element shown in Figure 8. In case of the embodiment shown in Figure 16 the longitudinal reinforcement beads along the edges of the top and bottom bars may be omitted.

As already indicated above the transverse bars in connection with the folding link chains may be omitted by providing the slat supporting members so as to form integral portions of the slats. An embodiment of this kind is illustrated in Figure 17. Here there is provided extending from each of the slat edges 80*a* and 80*b* side notches 114*a* and 114*b* of a longitudinal extension equal to or slightly larger than the width of the elements of the link chains. From the middle of these notches there extend projections 120 preferably within the limits of the lateral edges of the slats or only slightly beyond. Adjacent the ends these projections are provided with side notches 122*a*, 122*b* so as to provide adjacent to end projecting ears 123*a*, 123*b* for securing the projections in the position, in which they are projecting through the aperture in the links of the link chain.

The arrangement of the projections 120*a*, 120*b* in the bottom of the longitudinal notches 114*a*, 114*b* has the advantage that the link chains may be arranged totally within the limits of the lateral edges of the slats also in collapsible condition, so that the whole blind will occupy the least possible lateral space and thereby especially be convenient for mounting between glass surfaces in double glass windows.

From the end view in Figure 12 of the blind shown in Figure 11 it will be understood that the pockets in the elements also in folded position of the link chains will serve the purpose of receiving as well the ears of the neighbour element as the ears of the transverse bar.

It will be understood that the invention is not limited to the embodiments shown and described. Such for instance it will be understood that the side notches 84*a* and 84*b* in the slats are not absolutely necessary and can be omitted. They are useful, however, in order to make possible that the slats can be tilted to vertical position in order to provide fully closing of the Venetian blind. It will be understood that in the blind there is provided some sort of a mechanism operating the top bar to tilt it along its longitudinal axis so as to adjust the angle of the slats. Such mechanism is, however, generally known to those skilled in the art in many different embodiments and since it does not form part of the invention it is neither shown nor described.

I claim:

1. In a Venetian blind: a plurality of slats, a supporting ladder for said slats comprising link chains said chains composed of links in portions of two links between each slat and hingedly joined in edge-to-edge relationship, each hinge joint comprising two links angularly movable relative to each other, at least one of said two links having formed a transverse slot adjacent and spaced from the terminal edge of said link and the other link having an edge portion extending through said slot and secured in said extending position for hinging said two links, said extending edge portions being arranged alternately from opposite sides along the link chain, slat supporting members extending between said link chains and projecting through said link chains at every second hinge joint substantially aligned with the turning axis thereof and secured in said projecting positions.

2. In a Venetian blind: a plurality of slats, oppositely arranged pairs of supporting link chains for said slats, said chains composed of links having edge portions and hingedly joined in edge-to-edge relationship, each hinge joint comprising two links, at least one link having formed a transverse slot adjacent and spaced from the terminal edge of said link and the other link having an edge portion extending through said slot and secured in said extending position said extending edge portions being arranged alternately from opposite sides along the link chain and extending in opposite directions in each horizontal plane comprising two opposite joints in a pair of link chains, slat supporting members extending between said link chains and projecting through said link chains at every second hinge joint in direction of the element edge portion projecting through the transverse slot in the neighbour element substantially aligned with the turning axis thereof and secured in said projecting positions.

3. In a Venetian blind: a plurality of slats, supporting link chains for said slats, said chains composed of links having edge portions and hingedly joined in edge-to-edge relationship, each hinge joint comprising two links angularly movable relative to each other, at least one of said links having formed a transverse slot adjacent and spaced from the terminal edge of said link and the other link having an edge portion extending through said slot and secured in said extending position said extending edge portions being arranged alternately from opposite sides along the link chain, apertures formed in said link chains in at least every second hinge joint substantially aligned with the turning axis thereof, slat supporting members, projecting through said apertures at every second hinge joint and means for securing said slat supporting member in said projecting positions.

4. In a Venetian blind: a plurality of slats, supporting link chains for said slats, said chains composed of links having edge portions and hingedly joined in edge-to-edge relationship, each hinge joint comprising a link having formed a transverse slot adjacent and spaced from the terminal edge and a second link having an edge portion extending through said slot and secured in said extending position for hinging connection thereto, said extending edge portions being arranged alternately from opposite sides along the link chain, edge defining apertures formed adjacent the joined edges of said elements at least in every second hinge joint, one of said edges located substantially aligned with the turning axis thereof, slat supporting members having ends projecting through said apertures at every second hinge joint and sidewardly projecting ears at said projecting ends to secure them in said projecting positions.

5. In a Venetian blind ladder: two link chain tape bands arranged in juxtaposed spaced relationship and each comprising a plurality of substantially plane chain elements, each having side edges and end edges, a transverse slot provided at least adjacent and spaced from one end edge of each element, and an end edge portion of each element extending through each of said transverse slots alternately from opposite sides and secured in said extending position so as to form a plurality of one-way-break hinge joints, substantially plane surfaced connecting elements extending between said tape bands at every second hinge joint to connect the same, apertures through said tape band joints at least at every second hinge joint, end portions of said connecting elements extending through said apertures and means for securing said ends of said connecting elements in said extending position.

6. In a Venetian blind ladder: two link chain tape bands arranged in juxtaposed spaced relationship and each comprising a plurality of substantially plane surfaced chain link elements, each having side edges and end edges and an edge portion, a transverse slot formed in at least every second of said elements adjacent and spaced from one end edge thereof, an end edge portion of each neighbour element extending through each of said transverse slots alternately from opposite sides and secured in said extending position so as to form a plurality of one-way-break hinge joints, substantially plane surfaced connecting elements extending between said tape bands at every second hinge joint to connect the same, apertures formed in said tape bands at least at every second hinge joint, said connecting elements including end portions extending through said apertures, and means for securing said ends of said connecting elements in said extending position.

7. In a Venetian blind ladder: two link chain tape bands arranged in juxtaposed spaced relationship and each comprising a plurality of substantially plane link chain elements each having side edges and end edges joined in edge-to-edge relationship at their end edges, each joint comprising ears associated with an end edge portion of one element intergripping with ears associated with an end edge portion of the neighbour element alternately from opposite sides so as to form a plurality of one-way-break hinge joints, substantially plane surfaced connecting elements extending between said tape bands at every second hinge joint to connect the same, apertures through said tape band joints at least at every second hinge joint, end portions of said connecting elements extending through said apertures and ears associated with said extending end portions, and for securing them in said extending position.

JOHANNES HARALD BIERLICH.

References Cited in the file of this patent

UNITED STATES PATENTS

| Number | Name | Date |
|---|---|---|
| 2,200,143 | Wolfe | May 7, 1940 |
| 2,282,424 | Laird | May 12, 1942 |
| 2,357,751 | McGrew | Sept. 5, 1944 |
| 2,543,097 | Drefke | Feb. 27, 1951 |
| 2,601,896 | Wolfe | July 1, 1952 |

FOREIGN PATENTS

| Number | Country | Date |
|---|---|---|
| 2,181 | Austria | Sept. 25, 1900 |